United States Patent [19]

Chou

[11] Patent Number: 5,208,082
[45] Date of Patent: * May 4, 1993

[54] BLENDS AND STRUCTURES BASED ON ETHYLENE VINYL ALCOHOL COPOLYMER AND SELECTED AMORPHOUS POLYAMIDES

[75] Inventor: Richard T. Chou, Wilmington, Del.

[73] Assignee: E. I. Du Pont de Nemours and Company, Wilmington, Del.

[*] Notice: The portion of the term of this patent subsequent to Jun. 30, 2009 has been disclaimed.

[21] Appl. No.: 847,339

[22] Filed: Mar. 6, 1992

Related U.S. Application Data

[62] Division of Ser. No. 551,389, Jul. 12, 1990, Pat. No. 5,126,402.

[51] Int. Cl.$^5$ .................. B32B 27/30; B32B 27/32; B32B 27/34
[52] U.S. Cl. .................. 428/36.6; 428/475.8; 428/476.1; 428/476.3; 428/476.9; 428/474.4; 264/241; 525/56; 525/58; 525/60; 525/240; 525/221; 525/239; 525/241; 525/933; 525/426
[58] Field of Search ............... 525/56, 58, 60, 933, 525/221, 239, 240, 426; 428/36.6, 474.4, 475.8, 476.1, 476.3, 476.9, 500; 264/241

[56] References Cited

U.S. PATENT DOCUMENTS

| | | | |
|---|---|---|---|
| 4,952,628 | 8/1990 | Blatz | 525/58 |
| 4,990,562 | 2/1991 | Chou et al. | 525/58 |
| 5,126,402 | 6/1992 | Chou | 525/58 |
| 5,126,461 | 6/1992 | Chou | 525/58 |

*Primary Examiner*—James J. Seidleck
*Assistant Examiner*—W. R. M. Clark
*Attorney, Agent, or Firm*—Konrad Kaeding

[57] ABSTRACT

A blend of 5 to 95 percent of an ethylene vinyl alcohol copolymer and 95 to 5 percent of an amorphous polyamide having fewer than about 0.100 equivalents of carboxyl end groups per kilogram of polyamide exhibits improved oxidative and thermal stability. The blend is useful for preparing films and multiple layered structures including thermoformed structures and oriented shrink films.

12 Claims, No Drawings

BLENDS AND STRUCTURES BASED ON ETHYLENE VINYL ALCOHOL COPOLYMER AND SELECTED AMORPHOUS POLYAMIDES

This is a division of application Ser. No. 07/551,389 filed Jul. 12, 1990 now U.S. Pat. No. 5,126,402.

BACKGROUND OF THE INVENTION

This invention relates to a blend of ethylene vinyl alcohol copolymer and amorphous polyamide which provides thermoformable barrier layers with improved resistance to thermal and oxidative degradation.

Blends of ethylene vinyl alcohol polymers with polyamides in general are known, and have been used in packaging applications as barriers to inhibit the passage of atmospheric oxygen or other gases. European patent application 0 305 146 discloses a blend of about 70 to about 95 percent by weight of an ethylene vinyl alcohol copolymer having a copolymerized ethylene content of about 20 to about 60 mole percent and a degree of saponification of at least about 90%, and about 5 to about 30 percent by weight of an amorphous polyamide. The composition is useful as a barrier layer in thermoformed containers.

European patent application 0 309 095 discloses a blend of about 50 to about 95 weight percent of an amorphous polyamide and about 5 to about 50 weight percent of a vinyl alcohol polymer having a copolymerized ethylene content of 0 to about 60 mol percent and a degree of saponification of at least about 90%. The blends have oxygen barrier properties which are relatively independent of humidity. Packaging films, laminates, and containers prepared therefrom are disclosed.

Blends of ethylene vinyl alcohol ("EVOH") polymers with polyamides in general are known, and have been used in packaging applications as barriers to inhibit the passage of atmospheric oxygen or other gases.

Japanese patent application 53-49050 discloses a blend of ethylene vinyl alcohol copolymer (EVOH) with 5 to 40 weight percent polyamide. The EVOH contains 20-50 mole percent copolymerized ethylene, and is saponified at least 90%. The polyamides disclosed include a copolymer of hexamethylene diamine with isophthalic and terephthalic acids, in mole ratios of 100/0 to 50/50. The blend is formed into a film, which possesses gas barrier properties. The barrier performance of the film is purported not to decline even in highly humid atmospheres.

U.S. Pat. No. 3,726,034 discloses mixtures of 70–99% polyamide and up to 30% of a hydroxyl containing polyolefin. The polyamides consist of linear unbranched polymer chains containing no additional functional groups. Exemplified are blends of nylon 6 and EVOH.

Japanese patent application 53-49050 discloses a blend of EVOH with 5 to 40 weight percent polyamide. The polyamides include a copolymer of hexamethylene diamine with isophthalic and terephthalic acids, in mole ratios of 100/0 to 50/50. The blend is formed into a film, which is said to possess excellent gas barrier properties.

U.S. Pat. No. 4,079,850 discloses a multilayer blow molded container, which contains a layer which may be EVOH, polyamide, or various blends, providing gas barrier properties. The polyamides which are mentioned are nylon 6, nylon 66, and nylon 12.

U.S. Pat. No. 4,427,825 discloses a composition of matter useful for making films, of polyamide and 1–65% EVOH. Nylons with melting points greater than 175° C. are preferred, such as nylon 11 or nylon 12.

U.S. Pat. No. 4,500,677 discloses a resin composition comprising a mixture of two EVOH resins and a polyamide resin. The ratio of the EVOH resins to the nylon resin can be between 95:5 and 5:95. Nylon 6, nylon 6,6 and other polyamides having linear alkylene groups are specifically mentioned.

In spite of the excellent barrier properties of ethylene vinyl alcohol polymers, their use in blends has been limited to some extent because of the sensitivity of such polymers to thermal and oxidative degradation. In some instances blends of EVOH with polyamides have inadequate stability to degradation and gel formation. It is often observed that the melt viscosity of EVOH resins, whether alone or in a blend, increases with time, and the rate of increase increases with temperature. It is presumed that this effect may result from impurities remaining from the manufacturing process or introduced during blending, including interactions between the EVOH and components introduced by blending. It is known, for example that acids catalyze crosslinking reactions in EVOH, strong mineral acids such as HCl being especially potent. It is also possible that spontaneous dehydroxylation occurs at elevated temperatures, leading to interchain linkages. The resulting increase in viscosity can eventually cause gelation or solidification of the molten polymer. Such behavior can result in metal surfaces of processing equipment becoming coated with a varnish-like layer of intractable, discolored, degraded polymer. Buildup of this layer can cause a gradual rise in torque required for extruder screws and, when exfoliated, the sporadic appearance of gel particles in the extruded product, particularly when regrind is included in the composition. Furthermore, when molten EVOH is exposed to oxygen, e.g. through air incursion at feed and vent ports of extruders, ethylene vinyl alcohol copolymer can darken and crosslink to yellow-brown gel. As a result of these problems, comparatively low melt processing temperatures (210°–230° C.) are normally recommended for processing EVOH polymers, and even then such problems can persist.

There has been much activity to find a way to increase the thermal and oxidative stability of EVOH. As one example, British appln. 2,182,334 discloses a vessel comprising a composition of EVOH and a propylene resin or a thermoplastic resin having in the main or side chain a carbonyl group. The resin mixture is stabilized against gelation, discoloration, and reduction of gas barrier properties by incorporation of a hydroxide or higher fatty acid salt of an alkaline earth metal and an antioxidant.

U.S. Pat. No. 4,795,781 discloses a resin composition of saponified ethylene/vinyl acetate copolymer containing terminal carboxyl (—COOH) and terminal amide (—COOR') groups, wherein the number (A) . of the terminal carboxyl groups and the number (B) of terminal amide groups satisfies the relationship $(B)/(A)+(B) \times 100 \geq 5$. The polyamide resin is obtained by N-substituted amide modification of the terminal carboxyl group of the polyamide. It is preferable that the amount of the —COOH groups not converted is not more than 50 microequivalents/g polymer. When the terminal carboxylic groups have been thus modified, troubles of gel formation and of viscosity increasing are avoided. Suitable polyamides include those prepared from a variety of dibasic acids, including terephthalic acid and isophthalic acid.

U.S. Pat. No. 4,747,744 discloses an improvement in pinhole resistance or impact resistance in a resin composition of a saponified ethylene vinyl acetate and a polyamide having terminal end modification leaving carboxylic end groups of $3 \times 10^{-5}$ equivalent/g or less. During molding of films, etc., there will occur no gelling or other trouble which will make molding difficult, and the molded product has satisfactory gas barrier properties. Suitable polyamides include nylon 6, nylon 610, nylon 12, etc.

The present invention provides a composition which has the desirable formability properties of blends of amorphous polyamides and EVOH, without suffering degradation in stability otherwise characteristic of such blends.

SUMMARY OF THE INVENTION

The present invention provides a blend consisting essentially of:

(a) about 5 to about 95 percent by weight of at least one ethylene vinyl alcohol copolymer having a copolymerized ethylene content of about 20 to about 50 mole percent and a degree of saponification of at least about 90%, and (b) about 95 to about 5 percent by weight of a polyamide component comprising at least about 30 weight percent of at least one amorphous polyamide having a glass transition temperature of up to about 160° C. and fewer than about 0.100 equivalents of carboxyl end groups per kilogram, said polyamide component forming a separate phase from that of the ethylene vinyl alcohol copolymer.

The present invention further provides films and multiple layered structures prepared from such blends and formed structures, including thermoformed structures and oriented shrink films prepared therefrom.

DETAILED DESCRIPTION OF THE INVENTION

Materials and structures with barrier properties are important in many applications. Of particular interest are packaging materials which are barriers to the penetration of gases, such as oxygen, carbon dioxide, and various aromas.

In many packaging applications EVOH resins are used as relatively thin components of multilayer structures or containers. Usually the major parts of the structures are made of less expensive "structural" materials, bound to the EVOH layer by adhesive layers. The fabrication process in converting multilayer structures into final products often involves a mechanical deformation operation, such as orientation, thermoforming, or stretching in general, depending on the final form of the desired structure. However, EVOH generally exhibits very poor drawability, that is, the ability to be stretched or deformed uniformly at a temperature below its melting point. Quite often the stretching or deformation operation induces cracks, discontinuity or thinning ("neckdown") in the EVOH layer. As a result stretched or deformed multilayer structures which include a layer of EVOH resin often exhibit inferior barrier properties. If an amorphous polyamide is added to improve the drawability, however, the thermal and oxidative stability properties may suffer.

For the purposes of this invention, a deformation process includes any process for forming a shaped article (e.g., a film or a container) which (a) is distinct from the initial melt processing step and (b) which is performed at a temperature which is elevated above room temperature but lower than the melting point of the polymeric structural material. Casting of a film would not be a deformation process according to this definition because it is a melt processing step; vacuum-forming a film to prepare a container would be a deformation process. Making a film by a blown tubular process may or may not be a deformation process, depending on the temperature of the tubing or bubble at the location where blowing occurs. Examples of deformation processes include thermoforming (but excluding melt phase thermoforming), vacuum-forming, solid phase pressure forming, co-injection blow molding, co-injection stretch blow molding, tube extrusion followed by stretching, scrapless forming, forging, and tubular or flat sheet oriented film processes. Examples of articles that can be prepared using deformation processes are films and containers such as bottles, jars, cans, bowls, trays, dishes, pouches, oriented films, and shrink films. Deformation of polymeric materials is not only a way to attain such final shaped articles, but may also be a means to enhance barrier properties, mechanical properties, or even optical properties.

The temperature of the deformation step is usually determined by the "forming temperature" of the structural material, that is, the temperature at which it can be deformed. The forming temperature of a polymer is not readily related to any material properties of the polymer, except that it is normally higher than the Tg of the polymer. In addition, this temperature is affected by the magnitude and rate of deformation of the particular process employed. The forming temperature of a given material for a given process can be readily determined by a person skilled in the art with a minimum of experimentation. Many structural materials have a lower forming temperature than that of EVOH, and it may be desirable for many reasons to conduct a molding operation at as low a temperature as possible. Furthermore, it may be desirable to reach an extent of deformation as high as possible. Thus the temperatures used for the deformation of such multilayer structures may be so low or the extent of deformation may be so high that the drawability of the EVOH layer is exceeded. As a consequence the desired deformed articles cannot be made without tearing or rupturing of the EVOH layer. The resulting discontinuities in the EVOH layer result in inferior oxygen barrier performance of the resulting article. An object of this invention is to provide a modified EVOH composition which may be used in deformed multilayer structures to avoid the above mentioned problems, and without substantially sacrificing the excellent gas barrier properties of EVOH or causing undue oxidative or thermal degradation.

The first component of the composition of the present invention is an ethylene vinyl alcohol copolymer. The EVOH resins useful in this invention include resins having a copolymerized ethylene content of about 20 to about 60 mole %, especially about 25 to about 50 mole %. Copolymers of lower than about 15 to 20 mole % ethylene tend to be difficult to extrude while those above about 60 or 65 mole % ethylene have reduced oxygen barrier performance. These polymers will have a saponification degree of at least about 90%, especially at least about 95%. A degree of saponification of less than about 90% results in inferior oxygen barrier properties. The ethylene vinyl alcohol copolymer may include as an optional comonomer other olefins such as propylene, butene-1, pentene-1, or 4-methylpentene-1 in such an amount as to not change the inherent properties of the copolymer, that is, usually in an amount of up to about 5 mole % based on the total copolymer. The melting points of these ethylene vinyl alcohol polymers are generally between about 160° and 190° C.

Ethylene vinyl alcohol polymers are normally prepared by copolymerization of ethylene with vinyl acetate, followed by hydrolysis of the vinyl acetate component to give the vinyl alcohol group. This process is well known in the art.

The second component of the present invention is at least one selected amorphous polyamide. The polyamide component comprises about 5 to about 95 percent by weight of the total composition of EVOH plus polyamide, preferably about 10 to about 35 percent, and most preferably about 15 to about 30 percent.

The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute.

Examples of the amorphous polyamides that can be used include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine.

Examples of polyamides that can be used include those amorphous polymers prepared from the following dicarboxylic acids: isophthalic acid, terephthalic acid, alkyl substituted iso- and terephthalic acid, adipic acid, sebacic acid, butane dicarboxylic acid, and the like.

Polyamides prepared from aromatic diamines and aromatic diacids are also known. However, certain of these all-aromatic polyamides are known to be intractable under ordinary melt processing conditions, and thus are not normally suitable. Thus the preferred amorphous polyamides are those in which either the diamine or the diacid moiety is aromatic, and the other moiety is aliphatic. The aliphatic groups of these polyamides preferably contain 4–8 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms.

However, not all of these aromatic/aliphatic combinations will necessarily provide suitable amorphous polyamides. For example, specifically metaxylylenediamine adipamide is not generally suitable for this invention. This polymer readily crystallizes under heating conditions typical for thermoforming operations, and also crystallizes upon orienting. This illustrates the fact that it is important to determine that a particular polyamide is amorphous, and not to rely solely on the chemical structure of the polymer. This determination can easily be made by DSC.

Specific examples of amorphous polyamides which may be suitable for this invention include: hexamethylenediamine isophthalamide, hexamethylenediamine isophthalamide/terephthalamide terpolymer, having iso/terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediame with iso- or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer.

Polyamides prepared from aliphatic diamines with aliphatic diacids are the traditional semicrystalline nylons (also referred to as crystalline nylons) and are not amorphous polyamides. Many such semicrystalline nylon, particularly those having comparatively short carbon chains (such as nylon 6) are, in addition, completely miscible with EVOH and thus do not, by themselves, form the two-phase structure characteristic of the present invention.

The above amorphous polyamides, however, may contain as comonomers minor amounts of lactam species such as caprolactam or lauryl lactam, even though polymers prepared from on such monomers alone would not be amorphous. The important feature is that the polyamide as a whole is amorphous. Thus small amounts of these comonomers may be incorporated as long as they do not impart crystallinity to the polyamide. Similarly, limited amounts of semicrystalline nylons may be present along with the selected amorphous polyamide in blends of the present invention provided they are at levels which do not seriously interfere with the stability of the composition or cause the composition to become a single phase. But blends in which the amorphous polyamide is entirely replaced with a semicrystalline nylon do not exhibit the present improvement in stability, even when the acid end groups of the nylon fall within the limits defined below. Compositions may be suitable in which a semicrystalline nylon comprises about 0 to about 70 percent of the total polyamide component, although preferably the semicrystalline nylon is limited to about 10 to 40 or preferably about 20 to about 40 percent.

For most applications the Tg of the amorphous polyamide (as measured in the dry state, i.e., containing about 0.12 weight % moisture or less) should be in the range of about 60° C. to about 160° C., and preferably about 80° C. to about 130° C. Certain unblended amorphous polyamides, as described above, have $T_g$s of around 125° C. when dry. The lower limit on $T_g$ is not clearly demarked and is not believed to be critical; 60° C. is an approximate lower limit. The upper limit on the $T_g$ is likewise not clearly demarked. But amorphous polyamides with $T_g$ above about 160° C. are not easily processable readily thermoformable when used as a barrier layer. Thus all-aromatic polyamides, having aromatic groups in both acid and amine moieties, tend to have a $T_g$ which is too high to permit thermoforming, and are thus normally unsuitable for the purposes of this invention. As a secondary consideration, the molecular weight of the amorphous polyamide should be in a suitable range for ease of processing, yet not so low that the final product is brittle. Suitable molecular weights correspond approximately to an intrinsic viscosity (I.V.) of 0.5 to 0.95.

While amorphous polyamides in general provide ease of thermoforming to blends of ethylene vinyl alcohol copolymers, in many cases the thermal or oxidative stability of the blends are not as good as desired. For example, on extended heating the melt index of such blends may decrease dramatically and gel formation may occur. It has now been found that use of a select group of amorphous polyamides avoids this problem. Specifically, amorphous polyamides having less than about 100 milli-equivalents of terminal carboxyl groups per kilogram of polyamide are suitable, and those amorphous polyamides having less than about 85 or preferably less than about 55 milli-equivalents per kilogram are preferred. When such polyamides are used the blends exhibit significantly improved stability.

Normally polyamides will have a certain number of both acid and amine end groups derived from their diacid and diamine monomeric components. Commercially available amorphous polyamides typically have acid end groups in excess of 100 meq/kg of polymer. One method of preparing polyamides with the desired low level of such acid end groups involves carefully controlling the polymerization conditions. For example, a suitable amorphous polyamide may be prepared by mixing hexamethylenediamine with an appropriate amount of isophthalic and terephthalic acids in water to form the salt, adjusting the pH of the solution to about 8-9. (Very minor amounts of e.g. wax, inorganic acid catalyst, and antifoaming agent may also be added at this point.)

The acid and amine end groups in the final polymer can be controlled by known processes, for example, by addition of additional difunctional or monofunctional amines to shift the balance between acid and amine end distribution. There are many suitable difunctional amines, one of which is additional hexamethylenediamine; suitable monofunctional amines include octadecyl amine, benzyl amine, and others that will be apparent to one skilled in the art. (Small amounts of monofunctional acids such as acetic acid or stearic acid may also be added to control molecular weight.) The composition thus prepared is further polymerized e.g. in an autoclave at 280°-295° C. by known methods to form the final low-acid polymer.

The level of carboxyl end groups in a polyamide can be measured by dissolving a sample of the polymer in hot benzyl alcohol, followed by hot titration of the carboxyl groups with sodium hydroxide, using phenolphthalein indicator. Amine end groups can be analyzed by dissolving the polyamide in a hot mixture of 85% phenol and 15% methanol, followed by potentiometric titration with perchloric acid.

While not wishing to be bound by any theory, it is speculated that much of the thermal instability of blends of EVOH with amorphous polyamides is caused by acid-catalyzed reactions in the EVOH, due to the acid end groups of the polyamide. It is surprising that this effect should be important, because it would be expected that most of the end groups would be located within the separate domains of the amorphous polyamide. Any deleterious interaction with the EVOH would be expected to occur only at the interface of the EVOH and polyamide domains and should thus not be of great importance. It is speculated that many of the deleterious acid end groups in the amorphous polyamide may be actually located on low molecular weight polyamide oligomers which can diffuse into the EVOH material and cause deterioration. Preparation of the amorphous polyamide as described above may reduce the number of such comparatively active and mobile acid end groups to a safe level.

In addition to the above-described components, up to about 10 weight % of a liquid or solid plasticizer such as glycerol, sorbitol, mannitol, or aromatic sulfonamide compounds such as toluenesulfonamide ("Santicizer 8" from Monsanto) may be included with the amorphous polyamide. Customary amounts of antioxidants may also be employed.

Blends of the present invention can be made by traditional melt blending processes such as extrusion mixing. Films and multiple layer structures can be prepared by traditional process such as extrusion, coextrusion, lamination, blow molding, etc. Other formed articles can be made by the drawing, stretching, and thermoforming process described above.

The blends and structures of the present invention are useful where oxygen and/or flavor barrier properties and good adhesion properties are desired, e.g., in coextruded plastic structures, such as multilayer sheets and thermoformed containers therefrom, multilayer films including shrink films, pipes, tubes, blow-molded articles, and multilayer structures including thermoformed structures, in particular containers, particularly for food packaging applications. When thermoformed structures are prepared, at least one layer will preferably be prepared from a structural polymer such as polybutylene, polypropylene, polypropylene copolymers with ethylene, polyethylene, polyethylene copolymers, copolymers of ethylene with vinyl acetate, copolymers of ethylene with carboxylic acids wherein the carboxylic acid is unneutralized or is neutralized to form an ionomer, polyethylene terephthalate, polymers based on vinyl chloride, polymers based on styrene, and blends of such polymers.

EXAMPLES 1-7 AND COMPARATIVE EXAMPLES C1-C5

The thermal stability of blends of ethylene vinyl alcohol copolymer with certain amorphous polyamides was determined using a series of tests. Blends were prepared from 80 percent by weight ethylene vinyl alcohol copolymer containing 30 mole % copolymerized ethylene, melt index 3 dg/min, >99% saponification and 20 percent by weight of a polyamide. In Examples 1-7 the polyamides were amorphous polyamides prepared by condensation of hexamethylenediamine with 70% isophthalic acid and 30% terephthalic acid, (denoted "APA") having an inherent viscosity as indicated in the Table. (Inherent viscosity of the polyamide is determined by dissolving the polymer in hot m-cresol followed by viscosity measurement using a Schott Autoviscometer.) The polyamides, prepared by the method described above, had a level of acid end groups corresponding to less than 100 milli-equivalents/kg polyamide, as indicated in the Table. In Comparative Example C1 the polyamide was a commercial sample believed to be a similar isophthalic/terephthalic copolymer having IV and end group distribution as shown; in Comparative Example C2 the polyamide was of the same composition except having a higher acid group concentration, and in Comparative Example C3 the polyamide had yet a higher acid end group concentration. For Comparative Example C4 a semicrystalline nylon, nylon 6 (polycaprolactam) was used, which did have a comparatively low level of acid end groups. Blending and mixing of the samples was accomplished on an extruder, followed by pelletization.

After blending, the thermal stability of the compositions was evaluated by subjecting the samples to Haake mixing. In a typical run, a sample of 50 grams was mixed in a Haake mixer (Haake Buchler Instruments, Inc., Rheocord TM System 40), at 230° C. for 30 minutes and 50 r.p.m. The barrel temperature was set at 230° C., however, the melt temperature generally reached 240° to 250° C. due to sheer energy. The torgue (in meter-grams) at the end of the mixing is reported in Table I. (An increase in torque compared to the control sample, C5, suggests a crosslinking reaction.) The melt flow index (in dg/min, run at 230° C. after a 5 minute heating time) and the gel content of the sample after Haake treatment are also reported. The gel content was measured by dissolving 10 g of the sample in a mixture of 50:50 water:isopropanol at about 70° C. The gel was obtained by filtering the solution through a 200 mesh (0.074 mm) screen (for Examples 1–6 and Comparative Example C5) or a 100 mesh (0.14 mm) screent (for Comparative Examples C1–C3), to retain the dissolved gel. After drying, the gel content was calculated. The results in Table I show that the compositions of the present invention exhibit much improved thermal stability compared with examples in which either a polyamide having greater than 100 milli-equivalents acid end groups was used, or in which a semicrystalline nylon alone was blended with EVOH.

TABLE I

| Ex | Polyamide[a] Type | IV | ends: acid (meq/kg) | amine | Melt index after heat | Haake Torque | Gel % |
|---|---|---|---|---|---|---|---|
| 1 | APA | 0.89 | 85 | 62 | 1.44 | 510 | 0.38 |
| 2 | " | 0.85 | 49 | 88 | 2.10 | 480 | 0.33 |
| 3 | " | 0.83 | 48 | 88 | 1.97 | 460 | 0.58 |
| 4 | " | 0.76 | 54 | 90 | 2.56 | 450 | 0.16 |
| 5 | " | 0.73 | 29 | 93 | 2.25 | 420 | 0.22 |
| 6 | " | 0.68 | 44 | 102 | 2.67 | 490 | 0.24 |
| 7[b] | " | 0.71 | 28 | 103 | 1.30 | 326 | c |
| C1 | " | 0.87 | 163 | 27 | 0.11 | 885 | 14.80 |
| C2 | " | 0.82 | 150 | 31 | 0.14 | 800 | 5.96 |
| C3 | " | 0.76 | d | 31 | 0.11 | 720 | 6.27 |
| C4 | nylon6 | 68[e] | 45 | 52 | 0 (no flow) | 1380 | c |
| C5[f] | none | (EVOH only) | — | — | 2.10 | 534 | 0.23 |

[a] All examples except as noted are blends of EVOH and polyamide in an 80/20 weight ratio.
[b] EVOH and polyamide in a 35/65 weight ratio.
c Not measured.
[d] Measured value of 96 is believed to be erroneously low. Estimated value is above 120, based on method of preparation.
[e] Relative viscosity of 8.4 wt. % solution in 90% formic acid.
[f] Control example with no polyamide.

EXAMPLE 8

The blend composition of Example 4 was coextruded into a five layer sheet. The core layer (the blend of Example 4), 0.15 mm thick, was extruded using a 38 mm single extruder. Two surface layers, polypropylene homopolymers with a melt flow index of 2.0 (ASTM D-1238 Condition L), each 0.6 to 0.7 mm thick, were extruded on two separate single screw extruders, one 50 mm and the other 63.5 mm. Two adhesive layers, 0.05 to 0.07 mm thick, maleic anhydride grafted copolymer of propylene and ethylene, melt flow index 4.5 and melting point 144.C, were extruded on a 50 mm single extruder. The multiple layer sheet was cast onto rolls cooled with water having a temperature of about 90° C. Subsequently the cast multilayer sheet was thermoformed by solid state pressure forming on a Labform TM apparatus (Hydrotrim Co.) into cylindrical, can-shaped containers, 85 mm diameter and 127 mm deep. The sheet samples were heated by ceramic heaters at 320° to 380° C.; the sheet samples attained a temperature of 135° to 155 TM ° C. Forming was accomplished using plug assist air pressure of 480 kPa. The formed containers were free from defects by visual examination, and microscopic examination of the cross section of the container sidewalls, cut perpendicular to the axis, revealed a uniform core layer.

What is claimed is:

1. A multiple layer structure wherein at least one of the layers is prepared from a blend consisting essentially of:
    (a) about 5 to about 95 percent by weight of at least one ethylene vinyl alcohol copolymer having a copolymerized ethylene content of about 20 to about 50 mole percent and a degree of saponification of at least about 90%, and
    (b) about 95 to about 5 percent by weight of a polyamide component comprising at least about 30 weight percent of at least one amorphous polyamide having a glass transition temperature of up to about 160° C. and fewer than about 0.100 equivalents of carboxyl end groups per kilogram, said polyamide component forming a separate phase from that of the ethylene vinyl alcohol copolymer.

2. The multiple layer structure of claim 1 wherein the at least one amorphous polyamide comprises about 100 weight percent of the polyamide component.

3. The multiple layer structure of claim 1 wherein the polyamide component further comprises 0 to about 70 percent by weight of a semicrystalline polyamide.

4. The multiple layer structure of claim 1 wherein the polyamide component has fewer than about 0.055 equivalents of carboxyl end groups per kilogram of polyamide.

5. The multiple layer structure of claim 1 wherein the at least one ethylene vinyl alcohol copolymer contains about 25 to about 50 mole percent copolymerized ethylene and has a degree of saponification of at least about 95%.

6. The multiple layer structure of claim 1 wherein the at least one amorphous polyamide is selected from the group consisting of hexamethylenediamine isophthalamide, hexamethylenediamine isophthalamide/terephthalamide terpolymer, having isophthalic/terephthalic moiety ratios of 100/0 to 60/40, mixtures of 2,2,4- and 2,4,4-trimethylhexamethylenediamine terephthalamide, copolymers of hexamethylenediamine and 2-methylpentamethylenediamine with iso- or terephthalic acids, or mixtures of these acids.

7. The multiple layer structure of claim 1 wherein the at least one of the layers is a structural polymer.

8. The multiple layer structure of claim 7 wherein the structural polymer is selected from the group consisting of polybutylene, polypropylene, polypropylene copolymers with ethylene, polyethylene, polyethylene copolymers, copolymers of ethylene with vinyl acetate, copolymers of ethylene with carboxylic acids wherein the carboxylic acid is unneutralized or is neutralized to form an ionomer, polyethylene terephthalate, polymers based on vinyl chloride, polymers based on styrene, and blends of such polymers.

9. A formed structure prepared by thermoforming the multiple layer structure cf claim 7.

10. The formed structure of claim 9 in the form of a container.

11. The multiple layer structure of claim 1 in the form of a biaxially oriented film.

12. The multiple layer structure of claim 1 in the form of an oriented shrink film.

* * * * *